Jan. 25, 1938.    M. HEDLUND    2,106,248
CABLE MOUNTING FOR ELECTRICAL APPARATUS
Filed June 13, 1935
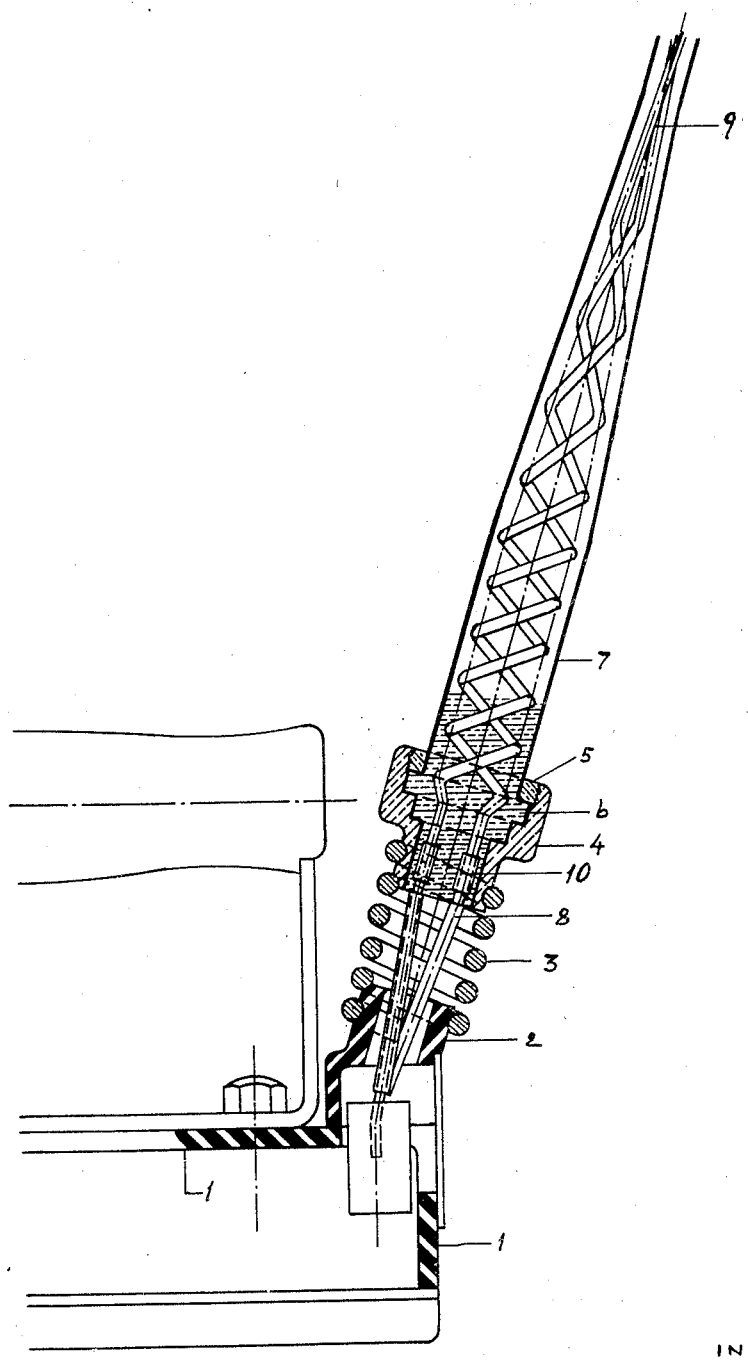
INVENTOR:
MATS HEDLUND
BY: Ruege & Boyce
ATTORNEYS Patented Jan. 25, 1938

2,106,248

UNITED STATES PATENT OFFICE 2,106,248

CABLE MOUNTING FOR ELECTRICAL APPARATUS

Mats Hedlund, Stockholm, Sweden

Application June 13, 1935, Serial No. 26,426
In Sweden August 18, 1933

2 Claims. (Cl. 219—25)

The cable-mounting on electric heating apparatus generally is spoiled by two causes:

(1) The conductors are exposed and are subject to mechanically being broken, at the point where they leave the mounting;

(2) The India rubber insulation of the conductors is exposed and is therefore liable to destruction within a short time through the heat of the heating apparatus.

The present invention contemplates an arrangement for overcoming these difficulties. The characteristic for this arrangement consists of the combination of a cooling spiral or similar device applied on the one side of the cable mounting between the same and the heat apparatus and the cable entering the other side of the cable mounting, which cable from its normal diameter at a certain distance from the cable-mounting widens gradually towards the cable-mounting.

Suitably the pitch of the screw line, formed by the conductors in the cable, also reduces towards the cable-mounting.

It has been proved that when none of these arrangements is employed, the durability of the cable is only about one month. If only the cooling spiral is employed, there is no increase in the durability of the cable. If only the cable-widening is employed, eventually with the reduced pitch in the screw line of the conductors, there is an increase of about 5 months in the durability of the cable. But if the arrangements are combined according to the invention, the durability of the cable is increased by several years. From this it is concluded that an unexpected and considerable improvement is gained by means of the said combination.

The durability of the cable will be further increased by making the conductors of the cable between the cable-mounting and the heating apparatus of material of low heat conducting capacity in relation to the heat conducting capacity of that material of which the conductors in the cable consist. For instance the conductors in the cable can be made of copper and the conductors of the cable between the cable mounting and the heating apparatus can be made of nickel or a similar stainless material of low heat conducting capacity.

On the attached drawing, illustrating the proposed arrangement in connection with an electric flat iron 1 as the heating apparatus to which a socket 2 is screwed. On 2 the cooling spiral 3 is screwed and in the upper end of the spiral 3 a coupling-box 4 is screwed in. By means of a ringshaped insulating nut 5 a flange 6 on the cable 7 is firmly secured. The conductors 8 of low heat conducting capacity from the heating apparatus extend without being stretched into the cable 7, where they at 10 are connected with the conductors in the cable, said cable tapering from the flange 6 up to the point 9, where the normal cable follows. According to the form of execution, shown in the drawing, the conductors of the cable immediately outside the flange 6 make a screw line with small pitch, which pitch gradually increases and at 9 passes into the normal cable.

What I claim is:—

1. A cable mounting for electric heating apparatus comprising a coupling box, a cable secured at one end in said coupling box and gradually increasing in diameter towards the coupling box, the wires in the cable having extensions extending between the coupling box and the heating apparatus and having the pitch of their screw line decreasing gradually towards the coupling box, and a cooling member connecting the coupling box with the heat apparatus and surrounding said extensions.

2. A cable mounting for electric heating apparatus comprising a coupling box, a cable secured with one end in said coupling box and gradually increasing in diameter towards the coupling box, the wires in the cable having extensions extending between the coupling box and the heat apparatus and having the pitch of their screw line decreasing gradually towards the coupling box, and a cooling member connecting the coupling box with the heating apparatus and surrounding said extensions which consist of material of low heat conducting capacity in comparison with the heat conducting capacity of that material of which the wires in the cable consist.

MATS HEDLUND.